UNITED STATES PATENT OFFICE.

ANTOINE HENRI IMBERT, OF GRAND-MONTROUGE, FRANCE.

PROCESS OF TREATING ZINC AND LEAD SULFID ORES.

No. 875,578.  Specification of Letters Patent.  Patented Dec. 31, 1907.

Application filed November 9, 1906. Serial No. 342,698.

*To all whom it may concern:*

Be it known that I, ANTOINE HENRI IMBERT, residing at 75 Avenue de la République, Grand-Montrouge, Department of the Seine, France, a citizen of the French Republic, have invented a new and useful Improved Process of Treating Zinc and Lead Sulfid Ores, of which the following is a specification.

The well known method of treating blende consists in first roasting it, then reducing the same with carbon and condensing the liberated zinc fumes. Such method which is used almost exclusively at present, presents the following defects among others: It necessitates the preliminary roasting of the ore; it is a relatively long operation, the reduction by carbon proceeding but slowly; it entails a very high temperature and the use of a large amount of fuel requires an expensive plant, and gives an imperfect yield. Attempts have heretofore been made to replace this method by others, among which it is important to mention that method which consists in heating a mixture of unroasted blende with a metal, iron being that usually employed, having at the given temperature, a higher affinity than zinc for the sulfur, in such a way as to form a sulfid of the said metal and to liberate the zinc which escapes in the form of fumes, which are thereafter condensed. This method is unsatisfactory for various reasons, for instance, the reaction is incomplete, and the requisite temperature, on account of the refractory character of the blende, is too high; and while a bath of sulfid of iron has been proposed for the purpose of overcoming these difficulties the use thereof has only been partially successful, and the fact that it has not been put into practical use is sufficiently accounted for in that the residue is not fluid; on the contrary the residue is in the nature of a mastic-like conglomerate which adheres to the retort and, when very hot, can only be removed with exceeding difficulty, and, when cooled, is practically impossible of removal, and may even ruin the retort. This method has accordingly been abandoned.

The object of the present invention is to render more practicable the metallurgical method of reducing blendes and analogous ores by the use of iron or other metals having a greater affinity for sulfur than the metals of the ores.

The invention consists in "dissolving" the blende which may be done either before or concurrently, or nearly so, with the introduction of the reagent, in a bath capable of making the action of the reagent metal rapid, uniform, regular and complete, while furnishing, after the zinc has been expelled, in the form of vapors, a residue which is also liquid and easy to discharge from the retort or closed vessel in which the operation has been conducted, by simply tapping it off into a suitable receptacle. If, for example, a mixture of lime (CaO), ferric oxid ($Fe_2O_3$) and the blende (ZnS) to be treated is placed in a retort heated to a temperature of about 1100° C., (the temperature at which zinc is volatilized) it is found that a perfectly fluid homogeneous bath is obtained, and if metallic iron, in the solid or fluid state be introduced into this bath, an energetic liberation of condensable vapors of zinc takes place, which may be condensed in a suitable condenser connected with the retort. The action is over in a comparatively short time, nearly the whole of the zinc rapidly escaping in the form of vapor. On emptying the retort, a perfectly liquid mass is found to run out, and when cooled down consists of an upper layer of slag and a lower stratum of iron sulfid. This slag and iron sulfid contain scarcely any zinc (barely 2 or 3% of the total contents of the blende). The order of procedure just described may be said to be preferable, but it is immaterial, as to the result, whether all be done concurrently.

It is known, especially in connection with the metallurgy of iron, that various metallic oxids have the property of melting very easily when they are mixed together in suitable proportions although they may be highly refractory, even at very high temperatures, when heated separately. Thus lime and ferric oxid, for instance, form a compound that fuses completely at a temperature of about 1000° C.–1100° C., and furnishes a very fluid bath without the assistance of silica at all. I have found that these liquid compounds are capable of "dissolving" other bodies, notably the metallic sulfids and especially the sulfids of zinc, lead, iron, manganese, etc., even when these sulfids are natural ores like blende, galena and others. Blende, in particular, which is nearly infusible at very high temperatures, dissolves readily in about half its own weight of a mixture of lime and ferric oxid; of lime and manganese oxid; or of calcined dolomite and ferric oxid or manganese oxid.

In using the terms "dissolve" or "solution" it is not intended to formulate any hypothesis on the physical or chemical nature of the phenomenon proved, namely the production of baths thoroughly fluid at the volatilization temperature of zinc, in which baths, composed of suitable mixtures of oxids of certain metals, the sulfids and ores like blende, galena, iron sulfids and the like, are liquefied or "dissolved".

From the foregoing, it will be evident that, the process forming the subject of the present invention may comprise numerous modifications. Some of these are set out below, but all of them possess, as a characteristic in common, the "solution" of the sulfid mineral under treatment, in a mixture of oxids giving a fluid bath, before or practically concurrently with the introduction of the metal serving as the reagent, and of giving an equally fluid residue after the volatilization or extraction of the metal to be recovered. The various modifications of the process will now be described from different points of view:

1. Of the oxids capable of furnishing the liquefying or solvent baths;
2. Of the metals capable of serving as reagents by substituting them in sulfid combinations, for the metal or metals to be extracted;
3. Of the nature of the ores suitable for treatment by this process; and
4. Of the apparatus and methods which may be employed in carrying the process into practice.

To produce a bath capable in the first place of "dissolving" sulfids or sulfid ores, and then, after the reaction of being able to preserve the fluidity of the residue, the following mixtures have been successfully employed: lime (CaO) and ferric oxid ($Fe_2O_3$) in equal proportions; lime and ferric oxid in the proportion of about 1 to 5; calcined dolomite (CaOMgO) and ferric oxid in the proportion of about 1 to 5; lime, ferric oxid and manganese oxid ($Mn_3O_4$), one third of each; calcined dolomite, ferric oxid and manganese oxid, also one third of each. It would seem to follow from this that, in order to obtain a suitable bath, it is necessary to have a mixture of one or several earthy bases with one or several suitable metallic oxids. The earthy bases (or basic oxids) which can be employed are: lime, magnesia and baryta. The metallic oxids (having the acid function) which can be employed are: oxid of iron, oxid of manganese and oxid of zinc. It is to be understood that the mixture for the bath must comprise at least one of these earthy bases and at least one of these oxids; but that the mixture may also be formed by combinations of earthy bases and oxids taken one-by-one, or one-by-two, or one-by-three or two-by-three, or three-by-three. It is important to note that in these mixed baths, "dissolving" the ores must not be confounded with the ordinary fluxes that have been heretofore used as adjuncts to the charge in order to furnish a fluid slag by combining with the gangue of the ore. This addition of fluxes does not effect the preliminary solution of the metal nor does it keep liquid the new sulfid formed, its sole purpose being to form a fluid slag.

Iron, preferably cast iron, may be used as the metal capable of expelling zinc or lead, etc., from the combination as sulfids; or if desired the ferro-metals, such as ferro-manganese, ferro-aluminium, etc., may be employed. The iron contents of the ferro-metal may vary considerably, and even fall to zero, that is to say, in case of need, use may be made of pure manganese, aluminium, and the like, if these metals are not too costly or if they can be afterwards recovered from their sulfids easily, cheaply and without waste. In the case of pure aluminium, however, the reaction would be too violent for practical use. Copper also gives good results, but must always be recove ed; whereas in the use of iron, which is the metal selected in preference, this complication does not ensue, since, owing to the low price of this metal, the process remains economical even if it be decided to abandon the iron and sulfur in the residues.

The ores which may be treated by the process forming the subject of this invention are, in the first place, blende and galena. Argentiferous or auriferous blendes may be mixed with galena in order to get the gold or silver into the lead. In the case of complex ores, that is to say, composed of a mixture of blende and galena, the greater part of the lead accumulates at the bottom of the retort, whence it can be drawn away with ease, while the rest of the lead is carried off with the fumes of the zinc and is condensed with them. If these complex ores contain the precious metals, gold or silver, these metals follow the molten lead. If a cupriferous blende is being treated, it is preferable to use copper as the reagent; in this case the native copper sulfid becomes associated with the matte formed during the reaction, and is treated with this by bessemerizing. When blendes are treated, the metallic zinc may, of course, be recovered by condensation, or in some cases the zinc fumes may be burned to convert them into zinc white. When applied to the metallurgy of zinc, that is to the treatment of zinc blende, the process can only be employed in a closed vessel. The point is to collect and thoroughly condense into a liquid state the large quantity of zinc that in a very short time is given off. But as all these reactions take place in the liquid state, and the reacting substances do not liberate the zinc unless the mixture reaches a state of fusion, it is advisable to have the largest heating surface possible, along with vessels capable of receiving and discharging the materials in a state of complete fusion. The coke retort used in gas works is the apparatus most completely conforming to these requirements, whatever the dimensions and sectional form of the retort may be; other kinds of retorts, however, may be employed, especially the various types used, in the industry of desilvering argentiferous lead by means of zinc, for recovering the zinc and finally separating it from the silver. These retorts in some countries are mounted in tilting furnaces; in others they are heated by gas or direct fuel heat in furnaces of various kinds. It is, however, essential that closed vessels should be used, the difficulties in the way of condensing the vapors of zinc in apparatus of the cupola or blast furnace class remaining the same whatever the chemical process employed.

For a daily output of any magnitude, furnaces heated by gas may be considered, each containing a single row of retorts of any number. These retorts may be as large as is compatible with their practical manufacture.

The retorts are closed at both ends by covers of the same material as that of the retort. One of these covers is provided with a charging aperture fitted with a door that can be simply and easily fastened so as to make a perfectly tight joint. The other cover is provided with an aperture, as large as the size of the retort permits, for carrying off the zinc fumes, and arranged in such a manner that the molten materials, in a state of ebullition inside the retort, cannot be projected into the aperture, which is in direct communication with the condenser by the shortest possible connection.

Two methods may be adopted for carrying out the invention according to the output required. For a small output, and to save the high prime cost of installation, the plant described above may be employed, and operated in the following manner: The mixture of ore and solvents being made beforehand by mechanical or other suitable means, the retorts are charged at regular given intervals, so as to render the work continuous. The desired quantity of the reagent selected is added to the charge in the retort, and the door is closed. The materials become progressively hotter, assuming a pasty state previous to melting, and at this point the reagent intervenes as soon as a certain temperature is reached, whereupon the liberation of the zinc begins, increasing rapidly with the growing fluidity of the bath, and ceasing only when the greater part of the zinc has distilled over. When this point is reached, after a heating period that is only determinable in each particular case by experience, the tap hole, situated under the charging door on the front cover of the retort, is opened. The molten material is run out into molds, after which the tap hole is closed, the retort is recharged, and so on.

The above method gives the smallest output per retort and with the largest consumption of fuel, all the heating being effected through refractory walls. The following method on the other hand gives the maximum output per retort with a minimum consumption of fuel. It, however, entails installation charges that are only compatible with a high diurnal production. The retort furnace is associated with a reverberatory furnace for the preliminary fusion of the mixture of blende and solvents, which mixture does not liberate any zinc at the temperature at which the whole is completely fused. The reagent is supplied in a molten state by a cupola, reverberatory furnace or blast furnaces. A system of charging ladles, hauled and operated by mechanical means, completes the plant. The reverberatory furnace, containing the molten mixture will deliver to the retort furnace, either a charge for the whole set of retorts or for a single retort only, according to the method of working adopted, after which the cupola supplies the corresponding charges of molten reagent, which is distributed by a ladle to the retorts as soon as they have received the liquid charge of material. The reaction in the retorts begins at once and is completed within a variable period, according to the weight of the charge, but at all events a much shorter time for a given charge is required than in the first method. The heating through a refractory wall is reduced to a minimum, all the rest of the heating being effected by open fire, in the reverberatory furnace and the cupola, that is to say with a minimum consumption of fuel. It is also possible to heat the retorts by electricity, so as to effect the heating from the inside and thus do away with the adverse action of the walls in resisting the passage of heat. In these two methods the condensation is effected in the same way, the object aimed at being the running, in a liquid state, of all the zinc contained in the charge. In the second method, however, the condenser must be of a size proportionate to the very copious liberation of the zinc fumes in a far shorter time than in the previous method.

A good condenser should offer the zinc a surface as extensive as possible, maintained at a constant temperature of about 500° C., as a minimum, and about 600° C., as a maximum. It should be perfectly air-tight, and the tap hole should be disposed in such a manner that no air can enter while the zinc is being drawn off. The condensing surfaces are kept at a constant temperature by various means, the most convenient being by a circulation of water or air through iron coils mounted in the walls.

The process is applicable to the complex ore (blende-galena), but is carried on without causing the separation of the lead by a first melting before effecting the expulsion of the zinc by volatilization.

In the treatment of the complex ore (blende-galena) the fusion of the ore is effected by the same solvent as that used for blende alone; but as soon as the reagent has been put in the bath, the nascent lead actively displaces the zinc of the blende and an abundant liberation of zinc at once occurs. Under these conditions, the method consists in fusing the ore with the normal solvent, adding an excess of the reagent and allowing the liberation of zinc to finish. This metal carries off with it a noteworthy fraction of the lead, and plumbiferous zinc is collected at the condenser and separated by the usual methods. In tapping the molten residue left in the retort, a mass of lead representing about two-thirds of the lead present in the ore, is found in the bottom of the mold. Nothing resembling this occurs in the copper process, the nascent lead being dissolved in the copper and having no action on the blende. On the other hand the preliminary fusion furnishes only an ingot of copper containing practically all the lead of the ore, which requires to be afterwards separated from the copper by liquation.

Having thus described my invention but without limiting myself to the precise operations and details specified, what I claim is:

1. The process of reducing metallic sulfid which consists in heating the sulfid in the presence of an oxid of such a character as to form a dissolvent for the said metallic sulfids with a metal having a greater affinity for sulfur than the metal of the sulfid.

2. The process of reducing sulfid ores which consists in heating the ore in the presence of an oxid of such a character as to form a dissolvent for the said sulfid ores with a metal having a greater affinity for sulfur than the metal of the ore.

3. The process of reducing metallic sulfids which consists in heating the sulfids with a mixture of an alkaline earth, and a metallic oxid of such a character as to form a dissolvent for the said metallic sulfids, and a metal having a greater affinity for sulfur than the metal of the sulfids.

4. The process of reducing zinc and lead sulfid ores, which consists in treating the ores with a mixture of a basic oxid and an acid oxid, of such a character as to form a dissolvent for the said sulfid ores, and metallic iron.

5. The process of reducing metallic sulfids which consists in treating the sulfid with a metal having a greater affinity for sulfur than the metal of the sulfid, in a bath composed of two or more oxids fusible at a temperature lower than the fusing point of any of the oxids composing the bath taken alone and capable of dissolving the sulfids which are to be treated.

6. The process of reducing zinc and lead sulfid ores which consists in treating the ores with a metal having a greater affinity for sulfur than the metal of the sulfids, in a bath composed of basic oxid, and an acid oxid, of such a character as to form a dissolvent for the said sulfid ores.

7. The process of reducing zinc and lead sulfid ores, which consists in treating the said ores with a dissolvent containing lime and ferric oxid, and with iron.

8. The process of reducing zinc and lead sulfid ores, which consists in treating the said ores with a dissolvent containing lime, magnesia and ferric oxid, and with iron.

9. The process of reducing zinc and lead sulfid ores, which consists in treating the said ores with a dissolvent containing lime, magnesia, baryta and ferric oxid, and with iron.

10. The process of reducing zinc and lead sulfid ores, which consists in treating the said ores with a dissolvent containing lime, magnesia, baryta, ferric oxid and manganese oxid, and with iron.

11. The process of reducing zinc and lead sulfid ores, which consists in treating the said ores with a dissolvent containing lime, magnesia, baryta, ferric oxid, manganese oxid and zinc oxid, and with iron.

In testimony whereof I have signed my name to this specification in the presence of two subscribing witnesses.

ANTOINE HENRI IMBERT.

Witnesses:
    FADAN J. STUNOCK,
    CLAUDIUS LUSSON.